3,103,530
PENTRAERYTHRITOL CYCLIC DIPHOSPHATE DIMETHYLSULFOXONIUM SALT AND PROCESS FOR PREPARATION
Rudi F. W. Rätz, Hamden, Conn., assignor to Olin Mathieson Chemical Corporation, New Haven, Conn., a corporation of Virginia
No Drawing. Filed Oct. 22, 1962, Ser. No. 232,296
3 Claims. (Cl. 260—461)

This invention relates to the preparation of a hitherto unknown sulfoxonium phosphate having the following structural formula:

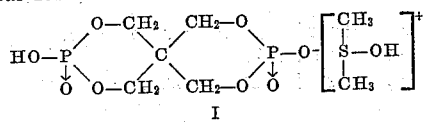

I

The above compound is the acidic dimethylsulfoxonium salt of 3,9-dihydroxy-2,4,8,10-tetraoxa-3,9-diphosphaspiro [5.5] undecane-3,9-dioxide.

One of the intermediates utilized in the work described herein is 3,9-dichloro-2,4,8,10-tetraoxa-3,9-diphosphaspiro [5.5] undecane-3,9-dioxide which is prepared in accordance with the improved process described in copending application S.N. 175,270, filed on February 23, 1962, wherein pentaerythritol is reacted with a molar excess of phosphoryl chloride.

This compound is represented by the following structural formula:

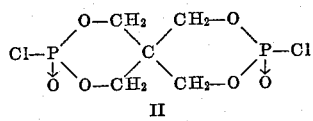

II

The primary object of this invention was to prepare a novel sulfoxonium spiro-phosphate. Another object of this invention was to utilize the dichloride (II) in the preparation of an acidic sulfoxonium phosphate which could be readily converted to a bifunctional spiro-phosphoric acid. Still another object of this invention was to provide a direct and efficient process for the preparation of the salt having the structure (I) shown above. Other objects will be apparent from the following discussion.

These objects have been accomplished in accordance with this invention. While investigating the use of dimethylsulfoxide as a solvent for the dichloride (II), it was found that this solvent itself reacted quite vigorously with the dichloride. The resulting reaction proceeded in an entirely unexpected manner, and a highly crystalline sulfoxonium salt having the structure (I) was obtained. The salt was obtained in quantitative yield and in a high degree of purity. An efficient process for the preparation of the sulfoxonium phosphate has been developed, and this process is characterized by the smoothness with which a quantitative yield of the desired salt can be obtained. Furthermore, the sulfoxonium phosphate has been used as an intermediate in the preparation of a bifunctional spiro-phosphoric acid.

The mechanism by which the sulfoxonium spiro-phosphate is formed is not completely understood. However, it is believed that the phosphorus bonded chlorine in the dichloride (II) is consumed to form methyl chloromethyl sulfide. It is believed that this sulfide then reacts with further dimethylsulfoxide to yield methyl methanethiolsulfonate, and this compound has been isolated and identified as a by-product of the reaction.

Quantitative yields of the desired sulfoxonium salt can be obtained by reacting at least four moles of dimethylsulfoxide with one mole of the dichloride. However, the interaction of the compounds is vigorously exothermic, and it may be desirable to use large excesses of the dimethylsulfoxide in order to moderate the exothermic reaction. In the absence of such large amounts of dimethylsulfoxide, it is necessary to control the temperature with various cooling techniques such as an ice bath, etc. However, when a large excess of dimethylsulfoxide is employed in the reaction process, the reaction temperature is moderated by this additional volume and, if desired, under these conditions the reaction may be performed up to about the boiling point of dimethylsulfoxide, ca. 190° C. Therefore, the salt may be prepared at temperatures in the range of about 0° C. to 190° C. However, it is preferred to control the temperature during the reaction period between about 5° C. and about 40° C.

The sulfoxonium phosphate described herein has utility as an intermediate in the preparation of 3,9-dihydroxy-2,4,8,10-tetraoxa-3,9-diphosphaspiro [5.5] undecane-3,9-dioxide. It has been found that the sulfoxonium salt, when subjected to pyrolysis above about 195° C. is converted in high yield to the above described bifunctional spiro-phosphoric acid. This strong acid is a solid which is characterized by non-hygroscopic properties. This bifunctional acid is particularly useful as a catalyst in condensation reactions, and it may be advantageously employed in place of the hygroscopic p-toluenesulfonic acid in such reactions. For example, it can be used as a catalyst in the cyclization of 1,4-butanediol to tetrahydrofuran. It may also be used generally in applications where the use of a strong, solid acid is preferred. Therefore, the preparation of the sulfoxonium salt described herein and its subsequent conversion to the corresponding bifunctional spiro-phosphoric acid provides an efficient and rapid method for the preparation of a useful strong acid.

The following examples will serve to illustrate the preparation of the compounds described herein. Example 1 shows the smoothness with which a quantitative yield of the novel sulfoxonium salt may be obtained, while Example 2 illustrates the ease with which the salt may be converted to a bifunctional spiro-phosphoric acid. It is to be understood that these examples are illustrative only, and they are not to be considered as limiting the scope of this invention.

*Example 1*

A reaction tube having a length of 7.5 inches and a one inch diameter was mounted in an upright position. It was connected by a U-tube with a side-arm test tube receiver which was immersed in a beaker filled with dry ice powder. Into the tube was placed 8.0 g. of dimethylsulfoxide and 3.0 g. of finely ground 3,9-dichloro-2,4,8,10-tetraoxa-3,9-diphosphaspiro[5.5]undecane-3,9-dioxide. An exothermic reaction occurred which was moderated by cooling the reaction tube with ice water. The reaction temperature was maintained at 5–10° C. by this technique. The clear and colorless reaction mixture completely solidified within ten minutes. This solid material was then stirred at room temperature with 15 ml. of anhydrous chloroform, and the suspended solid material was removed by filtration. This procedure was repeated with a second 15 ml. portion of anhydrous chloroform, and the combined isolated solid residues were then dried. The dried solid residue amounted to 3.7 g., essentially all of which was the water soluble sulfoxonium phosphate. A very small amount of water insoluble contaminating material was identified by conventional methods as paraformaldehyde. When the solid residue was recrystallized from absolute ethanol, small, colorless needles having a melting point of 174–176° C. were obtained. The following analytical data revealed that a quantitative yield of the acidic dimethylsulfoxonium salt of 3,9-dihydroxy-2,4,8,10 - tetraoxa - 3,9 - diphosphaspiro[5.5]undecane-3,9-dioxide had been obtained.

*Analysis.*—Calc'd for $C_7H_{16}P_2SO_9$: C, 24.92; H, 4.73; P, 18.32; S, 9.47. Found: C, 24.82; H, 4.91; P, 18.65; S, 9.18. Titration: 31.74 mg. sample required 2.97 ml. of 0.06364N dimethylamine solution for neutralization (phenolphthalein). Titration equivalent calc'd: 169. Found: 168.

The presence of a hydroxyl group bonded to the sulfur atom of the cation was shown by the distinct OH band at 2.95 $\mu$. This absorption could not be due to the P—OH group because such groups always show a broad and shallow absorption in the region of about 3.7 $\mu$.

*Example 2*

A 10 ml. distillation flask with bent side-arm leading into a receiver cooled with dry ice was set up. Into the flask was charged 0.2812 g. of the sulfoxonium salt prepared in Example 1. At 200° C. (oil-bath temperature) distillation of a liquid product was observed. A 0.01 mm. vacuum was applied for a short period. A light gray solid residue remained in the flask which, upon recrystallization from glacial acetic acid, amounted to 0.2 g. of bipyramidal crystals having a melting point of 295–297° C. This material was identified as 3,9-dihydroxy-2,4,8,10 - tetraoxa - 3,9 - diphosphaspiro[5.5]undecane - 3,9-dioxide by the following analytical data.

*Analysis.*—Calc'd for $C_5H_{10}O_8P_2$: C, 23.20; H, 3.85; P, 23.82. Found: C, 23.45; H, 3.60; P, 23.32.

The distilled liquid was analyzed by vapor phase chromatography methods and according to the retention times consisted mainly of dimethylsulfoxide and dimethylsulfide.

What is claimed is:

1. A salt having the structural formula:

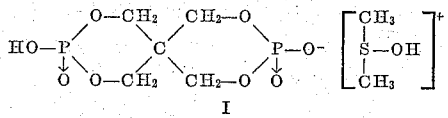

I

2. A process for the preparation of an acidic sulfoxonium phosphate which comprises reacting 3,9-dichloro-2,4,8,10-tetraoxa-3,9-diphosphaspiro [5.5] undecane-3,9-dioxide with dimethylsulfoxide at a temperature in the range of about 0° C. to 190° C.

3. The process of claim 2 wherein the reaction is performed at a temperature in the range of about 5° C. to 40° C.

No references cited.